(12) United States Patent
Scheuer

(10) Patent No.: US 7,907,849 B1
(45) Date of Patent: Mar. 15, 2011

(54) SECURE COMMUNICATION SYSTEM AND METHOD FOR EXCHANGING DATA UNITS

(75) Inventor: Jacob Scheuer, Ramat Gan (IL)

(73) Assignee: Ramot At Tel-Aviv University Ltd., Tel-Aviv (IL)

( * ) Notice: Subject to any disclaimer, the term of this patent is extended or adjusted under 35 U.S.C. 154(b) by 1034 days.

(21) Appl. No.: 11/686,384

(22) Filed: Mar. 15, 2007

(51) Int. Cl.
*H04B 10/12* (2006.01)
*H04B 10/00* (2006.01)

(52) U.S. Cl. .......... 398/141; 398/169; 398/170; 398/66; 380/256; 380/278

(58) Field of Classification Search .............. 398/141, 398/151, 169, 170, 182, 200, 201, 69, 66; 380/256, 278
See application file for complete search history.

(56) References Cited

U.S. PATENT DOCUMENTS

| | | | |
|---|---|---|---|
| 7,471,793 B2 * | 12/2008 | Bonfrate et al. | 380/256 |
| 7,583,803 B2 * | 9/2009 | Trifonov | 380/278 |
| 7,639,947 B2 * | 12/2009 | Luo et al. | 398/89 |
| 2006/0263096 A1 * | 11/2006 | Dinu et al. | 398/187 |

* cited by examiner

*Primary Examiner* — M. R. Sedighian
(74) *Attorney, Agent, or Firm* — Reches Patents

(57) ABSTRACT

A communication system, the communication system includes: a first decision entity; and a long laser that includes a first reflector and a second reflector; wherein a lasing characteristic of the long laser is responsive to: (i) first data unit that is provided by a first user and affects a reflection spectrum of the first reflector, and (ii) second data unit that is provided by a second user and affects a reflection spectrum of the second reflector; and wherein the first decision entity is adapted to receive the first data unit and information representative of the lasing characteristic, as well as to determine (i) a relationship between the first data unit and the second data unit, or (ii) a content of the second data unit.

22 Claims, 9 Drawing Sheets

Figure 3a
Figure 3b
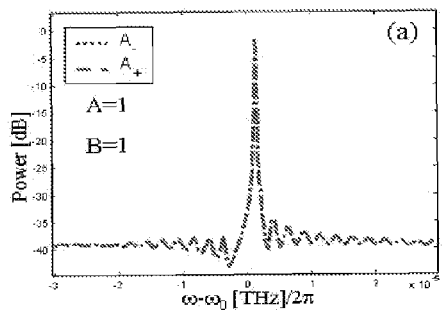
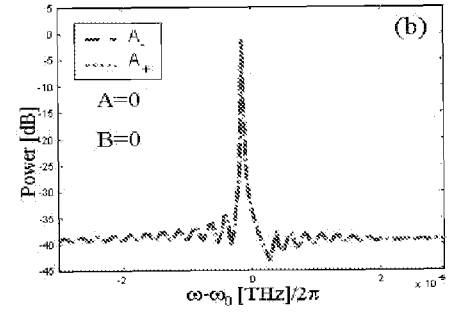
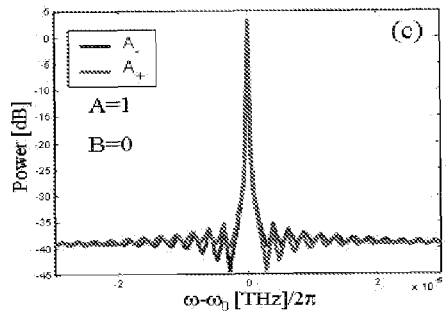
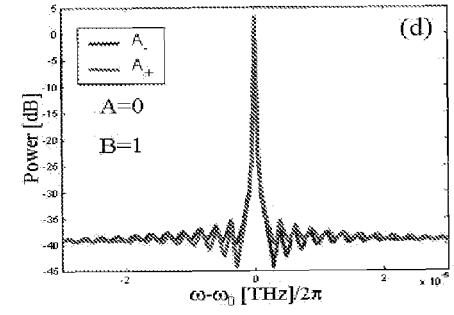
Figure 3c
Figure 3d

Figure 4b                     Figure 4c

SECURE COMMUNICATION SYSTEM AND METHOD FOR EXCHANGING DATA UNITS

FIELD OF THE INVENTION

The invention relates to systems and methods for secure communication, and especially to methods and systems for exchanging a secret key.

BACKGROUND OF THE INVENTION

The distribution of a secret key is probably the main Achilles' heel of many secure communication system. To establish a completely secure information transfer it is necessary for two users to share a secret key, known only to them, before the communication can take place. In many practical scenarios, especially when the two users are separated by a large distance, this requirement is difficult to realize because secure transmission of the key requires a previously shared (additional) key.

This loophole was one of the main incentives behind the attempts to develop physically (as opposed to algorithmically) secure key distribution schemes, based on the fundamental properties of quantum mechanics. Although ideally such communication protocols are perfectly secured, their practical implementation is not simple. Noise and attenuation in the quantum channel significantly reduce their efficiency, especially from the range and data rate aspects. Theoretical and experimental studies show that channel attenuation, noise and detector dark-counts limit the key-establishing rates and the operational ranges of Quantum Key Distribution (QKD) systems.

Various prior art QKD systems, as well as some of the problems associated with QKD systems are illustrated in the following cited articles, patents and patent applications, provide a general background of the prior art: C. H. Bennett and G. Brassard, "Quantum cryptography: Public key distribution and coin tossing", International Conference on Computers, Systems & Signal Processing, Bangalore, India, December 10-12, pp 175-179 (1984); N. Gisin, G. Ribordy, W. Tittel and Zbinden, "Quantum cryptography", Rev. Mod. Phys. 74, pp. 145-195 (2002); A. Ekert, "Beating the code breakers", Nature 358, pp. 14-15 (1992); E. Waks, K. Inoue, C. Santori, D. Fattal, J. Vuckovic, G. S. Solomon, and Y. Yamamoto, "Quantum cryptography with a photon turnstile", Nature 420, p. 762 (2002); L.-M. Duan, M. D. Lukin, J. I. Cirac and P. Zoller, "Long-distance quantum communication with atomic ensembles and linear optics", Nature 414, pp. 413-418 (2001); M. Aspelmeyer, H. R. Bohm, T. Gyatso, T. Jennewein, R. Kaltenbaek, M. Lindenthal, G. M Terriza, A. Poppe, K. Resch, M. Taraba, R. Ursin, P. Walther, and A. Zeilinger, "Long-Distance Free-Space Distribution of Quantum Entanglement" Science 301, pp. 621-623 (2003); I. Marcikic, H. de Reidmatten, W. Tittel, H. Zbinden, M. Legre, and N. Gisin, "Distribution of Time-Bin Entangled Qubits over 50 km of Optical Fiber", Phys. Rev. Lett. 93, p. 180502 (2004); R. J. Hughes, G. L. Morgan and C. G. Peterson, "Quantum key distribution over a 48 km optical fiber network", J. Mod. Opt. 47, pp. 533-547 (2000); C. Gobby, Z. L. Yual and A. J. Shields, "Quantum key distribution over 122 km of standard telecom fiber", Appl. Phys. Lett. 84, pp. 3762-3764 (2004); U.S. Pat. No. 6,529,601 of Towsend; U.S. Pat. No. 6,748,081 of Dultz et al; U.S. Pat. No. 7,068,790 of Eliott; U.S patent application 2004/032954 of Bonfarte; U.S patent application 2006/193636 of Katagitie; US patent application 2006/239463 of Young; and PCT patent application WO/0697966 of Cortese.

Recently, a classical Key Distribution System (KDS) utilizing Johnson noise in resistors was suggested. Although conceptually interesting, the suggested scheme was found to be vulnerable to an analysis of the transients of the electromagnetic waves propagating in the transmission line connecting the two parties. Such prior art KDS systems as well as some of the problems associated with these KDS systems are illustrated in the following articles, and provide a general background of the prior art: L. B. Kish, "Totally secure classical communication utilizing Johnson (-like) noise and Kirchoff's law", pla15171, in press, doi:10.1016/j.physleta.2005.11.062; A. Cho, "Simple Noise May Stymie Spies Without Quantum Weirdness", Science 309, p. 2148 (2005); J. Scheuer and A. Yariv, "A Classical Key-Distribution System based on Johnson (like) noise—How Secure?", arXiv: physics/0601022 v3, 8 Jan. 2006; and P. W. Shor and J. Preskill, "Simple proof of security of the BB84 quantum key distribution protocol", Phys. Rev. Lett. 85, pp 441-444 (2000).

There is a need to provide highly secured communication systems and methods.

SUMMARY

A method for communicating information, the method includes: setting a reflection spectrum of a first reflector of a long laser, in response to a first data unit received by a first user; setting a reflection spectrum of a second reflector of the long laser, in response to a second data unit received by a second user; causing the long laser to oscillate, wherein a lasing characteristic of the long laser is responsive to the reflection spectra of the first and second reflectors; and determining, by a first decision entity, in response to the long laser's lasing characteristic and in response to the first data unit, a second data unit indication, indicative of a relationship between the first data unit and the second data unit or of a content of the second data unit.

A communication system, the communication system includes: a first decision entity; and a long laser that includes a first reflector and a second reflector; wherein a lasing characteristic of the long laser is responsive to: (i) first data unit that is provided by a first user and affects a reflection spectrum of the first reflector, and (ii) second data unit that is provided by a second user and affects a reflection spectrum of the second reflector; and wherein the first decision entity is adapted to receive the first data unit and information representative of the lasing characteristic, as well as to determine (i) a relationship between the first data unit and the second data unit, or (ii) a content of the second data unit.

SHORT DESCRIPTION OF THE DRAWINGS

The present invention will be understood and appreciated more fully from the following detailed description taken in conjunction with the drawings in which:

FIGS. 3a-3d illustrate a steady state spectrum of the electromagnetic field at the middle of a long laser, assuming that the long laser does not include filters or noise sources;

FIGS. 4a-4c illustrate the masking effect of a first and a second filter;

DETAILED DESCRIPTION OF THE DRAWINGS

Methods and systems for secure exchange of data units are provided. The data units can form a secret key that is later used to establish secure communication sessions. The data unit can be one-bit long but this is not necessarily so.

According to an embodiment of the invention, a first user and a second user can send data to each other one bit at a time. According to other embodiments of the invention, multiple bits can be substantially concurrently exchanged between a first user and a second user using wavelength division multiplexing. The first user and second user can be located several kilometres and even hundreds of kilometres from each other.

Conveniently, the systems and method are based upon controlling a lasing characteristic of a long fibre laser. The long laser oscillates in response to a first data unit provided by a first user and a second data unit provided by a second user.

Compared to quantum mechanics based systems, the suggested method and system allows for significantly higher (by several orders of magnitude) key-establishing rates and longer ranges. By properly designing the long laser, it is possible to increase the difficulty of eavesdropping almost arbitrarily, thus making the suggested methods and systems an intriguing alternative and a complementary technology to quantum key distribution systems. The eavesdropping prevention can include masking low-amplitude components of light propagating through the long laser.

Figure 1:
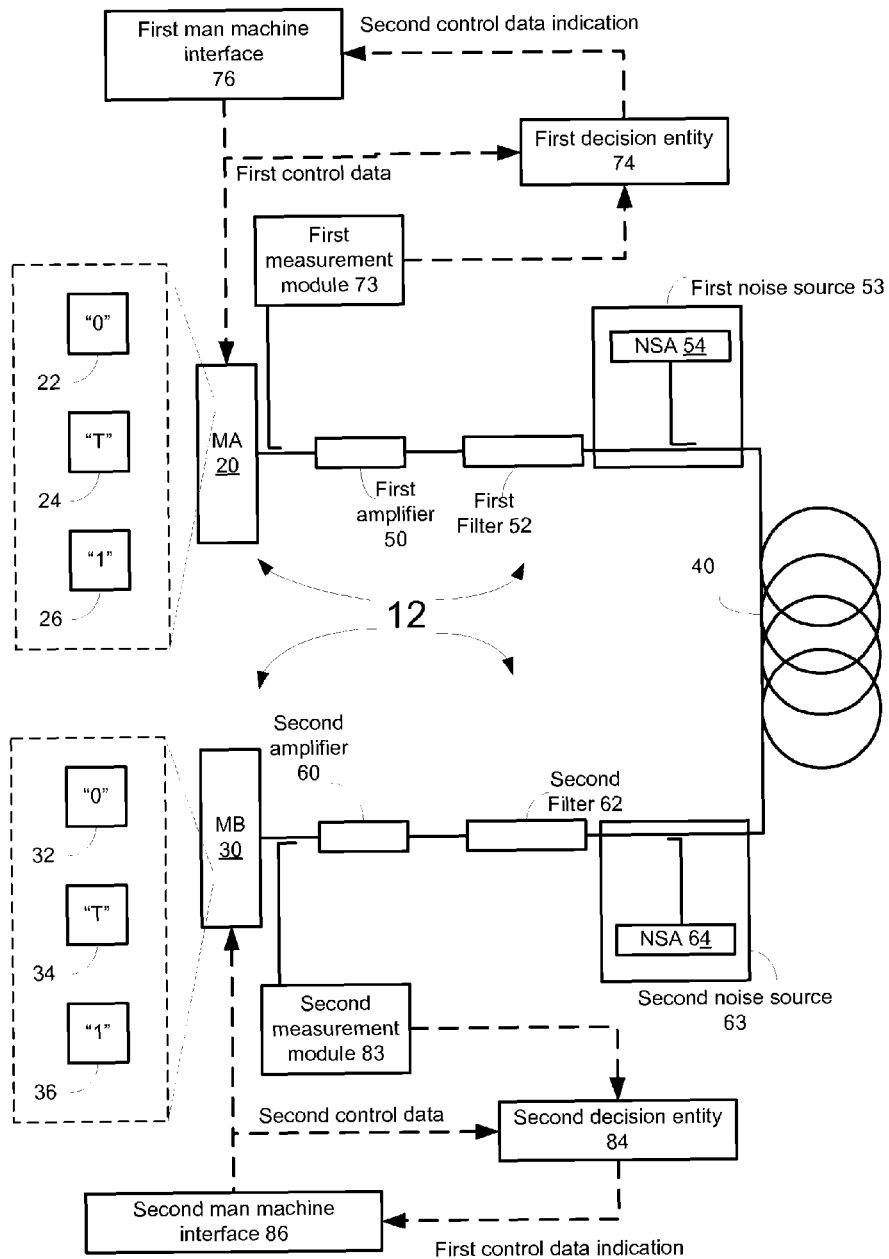
FIG. 1 illustrates a system according to an embodiment of the invention.

FIG. 1 illustrates system 10 according to an embodiment of the invention.

System 10 includes long laser 12, first interface such as first man-machine interface 76, first decision entity 74, first measurement module 73, first noise source 53, second interface such as second man-machine interface 86, second decision entity 84, second measurement module 83 and second noise source 63.

On one end, long laser 12 includes first reflector (MA) 20, first amplifier 50, first filter 52 and a first noise source 53. First noise source 53 includes first noise generator (NSA) 54 and a coupler that couples the output of first noise generator 54 to the output of first filter 52 thus enabling an injection of noise into long fibre 12.

On the other end, long laser 12 includes second reflector (MB) 30, second amplifier 60, second filter 62 and second noise source 63. Second noise source 63 includes first noise generator (NSB) 64 and a coupler that couples the output of second noise generator 64 to the output of first filter 62 thus enabling an injection of noise into long fibre 12.

Long fibre 40 is positioned between the outputs of first and second noise sources. It is noted that these noise sources are optional.

First man-machine interface 76 can receive a first data unit from Alice and can send the first data unit to first reflector 20 and to first decision entity 74. The first data unit affects a reflection spectrum of first reflector 20. The first data unit can be used for selecting between reflection elements of first reflector 20 that have different reflection spectra. According to another embodiment of the invention, the first data unit can determine a shift in the frequency of the first reflector 20 using diverse mechanism such as mechanical, thermal, electro-optical, acousto-optical etc., such as to affect the reflection spectrum.

Second man-machine interface 86 can receive a second data unit from Bob and sends the second data unit to second reflector 30 and to second decision entity 84. The second data unit affects a reflection spectrum of second reflector 30. The second data unit can select between reflection elements of second reflector 30 and has the option to determine either a mechanical movement of second reflector 30 or one of its elements, such as to affect the reflection spectrum. The mechanical movement can include moving a micro-mechanical element, stretching second reflector 30 and the like.

The reflection spectra of first and second reflectors 20 and 30 determine a lasing characteristic of long laser 12. For example, these reflection spectra can determine the lasing frequency of long laser 12 and can determine the amplitude of the lasing frequency light component. A more detailed example is provided in the following pages.

First decision entity 74 receives the first data unit and an indication of the lasing characteristic of long laser 12. The indication can be provided by first measurement module 73 that receives a sample of light that propagates through long laser 12. Typically, first reflector 20 provides a light sample to first measurement module 73.

First decision entity 74 provides Alice, via first man-machine interface 76, a second data unit indication that can indicate what is the content of the second data unit or can indicate the relationship (for example correlation) between the first and second data units. Sending an indication about the correlation between the first and second data units is safer.

Second decision entity 84 receives the second data unit and an indication of the lasing characteristic of long laser 12. The indication can be provided by second measurement module 83 after receiving a sample of light that propagates through long laser 12. Typically, second reflector 30 provides a light sample to second measurement module 83.

Second decision entity 84 provides Bob, via second man-machine interface 86, a first data unit indication that can indicate what is the content of the first data unit or can indicate the relationship (for example correlation) between the first and second data units. Sending an indication about the correlation between the first and second data units is safer.

Long laser 12 conveys correlation information that describes the correlation between the first and second data units. The correlation information is carried over a relatively narrow frequency band (also referred to as correlation information frequency band) that includes at least one lasing frequency of long laser 12.

In addition, long laser 12 also conveys information that may reveal the content of the first data unit as well as information that may reveal the content of the second data unit. This type of information is referred to as reflector signature. The reflector signature is typically carried over low amplitude frequency components that are located outside the correlation information frequency band.

Long laser 12 can be a fibre laser such as, but not limited to, a long erbium-doped fibre laser.

It is assumed, for simplicity of explanation, that first reflector 20 includes a set of three reflecting elements such as first till third mirrors 22, 24 and 26. It is further assumed that second reflector 30 includes a set of three reflecting elements such as fourth till sixth mirrors 32, 34 and 36.

First mirror 22 and fourth mirror 32 are labelled "0" indicating that they represent a selection of a "0" valued data unit. Second mirror 24 and fifth mirror 34 are used for synchronization and are labelled "T". Third mirror 26 and sixth mirror 36 are labelled "1" indicating that they represent a selection of a "1" valued data unit.

Alice can arbitrarily select which mirror will be used to reflect light by sending a first data unit that reflects her selection ("0" or "1") to first reflector 20. Bob can arbitrarily select which mirror will be used to reflect light by sending a second data unit that reflects his selection ("0" or "1") to second reflector 30. It is noted that selecting the "T" mirror takes place in the synchronization stage by Bob and Alice.

The reflection spectra of first, second and third mirrors 22, 24 and 26 are shifted in relation to each other. The reflection spectra of fourth, fifth and sixth mirrors 32, 34 and 36 are shifted in relation to each other.

Figure 2:
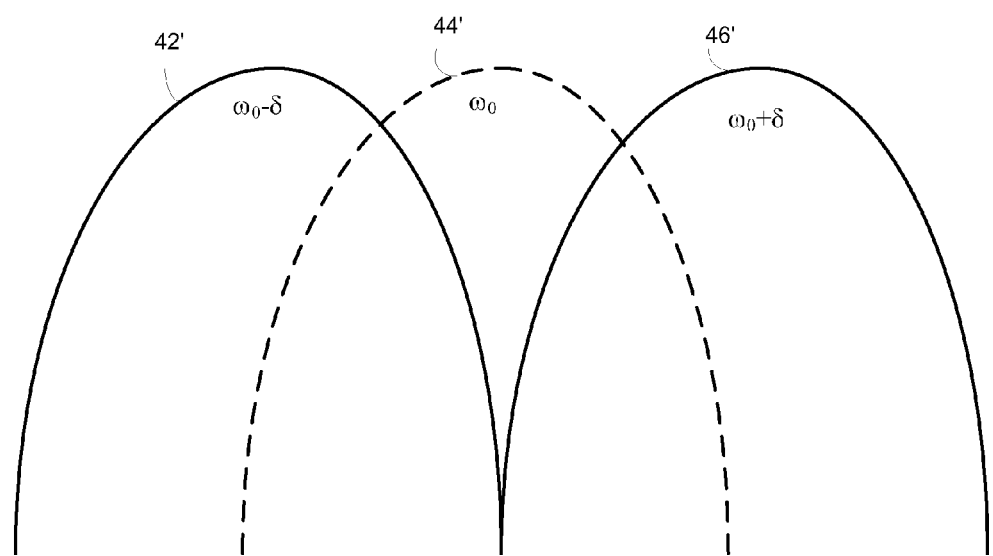
FIG. 2 illustrates reflection spectra of mirrors.

The reflection spectrum of first mirror 22 and fifth mirror 32 is centred on first frequency $\omega_0-\delta\omega$. The reflection spectrum of second mirror 24 and fourth mirror 34 is centred on second frequency $\omega_0$. The reflection spectrum of third mirror 26 and sixth mirror 36 is centred on third frequency $\omega_0+\delta\omega$. FIG. 2 illustrates reflection spectra of mirrors 22-26 and 32-36. Curve 42' illustrates the reflection spectrum of first and fourth mirrors 22 and 32. Curve 44' illustrates the reflection spectrum of second and fifth mirrors 24 and 44. Curve 46' illustrates the reflection spectrum of third and sixth mirrors 26 and 46.

It is noted that the correlation information frequency band includes first till third frequencies $\omega_0-\delta\omega$, $\omega_0$ and $\omega_0+\delta\omega$.

Conveniently, first and second amplifiers 50 and 60 are designed to amplify light components within the correlation information frequency band.

Conveniently, each communication cycle starts with a synchronization stage during which Alice selects second mirror 24 and Bob selects fourth mirror 34. Accordingly, the reflection spectra of first and second reflectors 20 and 30 are centred at second frequency $\omega_0$. The synchronization phase resets the symmetry of system 10 and establishes synchronization.

The synchronization stage is followed by a data transfer stage. During the data transfer stage Bob and Alice randomly select a bit (i.e., "0" or "1") and switch-on the appropriate mirror. The gain of long laser 12 is maintained at a level such that when Bob and Alice pick different bits, there is sufficient gain for the laser to lase at $\omega_0$ but at a lower amplitude compared to the "T" state. If Alice and Bob choose "1" the lasing wavelength shifts to $\omega_0+\delta\omega$ and if Alice and Bob choose "0" the lasing wavelength shifts to $\omega_0-\delta\omega$.

The electromagnetic field evolving in long laser 12 is a superposition of rightward propagating wave $A_+(\omega)$ 92 that propagates from Alice to Bob and of leftward propagating wave $A_-(\omega)$ 94 that propagates from Bob to Alice.

FIGS. 3a-3d illustrate the steady state spectrum of the electromagnetic field at the middle of long laser 12, assuming that long laser 12 does not include first and second filters 52 and 62 and does not include first and second noise sources 54 and 64.

FIG. 3a illustrates a selection of third and sixth mirrors 26 and 36 (1, 1) by Alice and Bob. In this case the lasing frequency of laser 12 is $\omega_0+\delta\omega$. FIG. 3b illustrates a selection of first and fourth mirrors 22 and 32 (0, 0) by Alice and Bob. In this case the lasing frequency of laser 12 is $\omega_0-\delta\omega$.

FIG. 3c illustrates a selection of third mirror 26 ("1") by Alice and of fourth mirror 32 ("0") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors).

FIG. 3d illustrates a selection of first mirror 22 ("0") by Alice and of sixth mirror 36 ("1") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors). The spectrum of FIG. 3c is a mirror image of the spectrum of FIG. 3d.

According to an embodiment of the invention, system 10 is capable of masking the data-revealing information, or otherwise preventing a third party from learning the content of the first and second data units based upon the data-revealing information.

The masking can be implemented by using various components such as narrowband filters, noise sources and the like.

FIG. 1 illustrates long laser 12 as including first band-pass filter (referred to as first filter) 52 and second band-pass filter (referred to as second filter) 62 that filter out (attenuate) light components that are outside the correlation information frequency band.

Figure 4A:
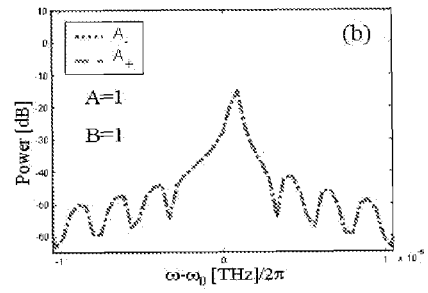
Figure 4A:
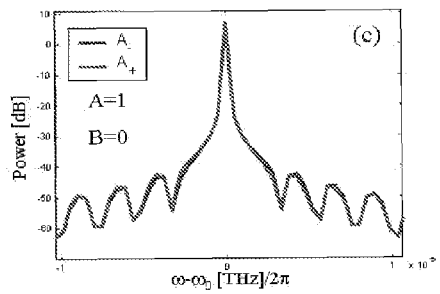
Figure 4A:
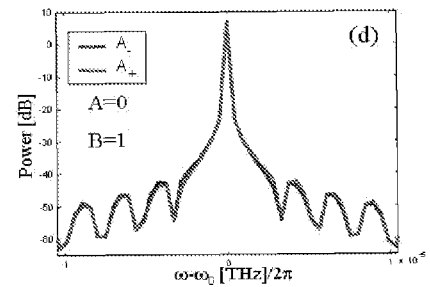

FIGS. 4a-4c illustrate the masking effect of first and second filters 52 and 62. These figures illustrate the steady state spectrum of the electromagnetic field at the middle of long laser 12, assuming that long laser 12 includes first and second filters 52 and 62 but does not include first and second noise sources 54 and 64.

FIG. 4a illustrates a selection of third and sixth mirrors 26 and 36 (1, 1) by Alice and Bob. In this case the lasing frequency of laser 12 is $\omega_0+\delta\omega$. FIG. 4b illustrates a selection of third mirror 26 ("1") by Alice and of fourth mirror 32 ("0") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors). FIG. 4c illustrates a selection of first mirror 22 ("0") by Alice and of sixth mirror 36 ("1") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors). The spectrum of FIG. 4b is a mirror image of the spectrum of FIG. 4c.

FIGS. 4b-4d show that while the additional filtering does not significantly affect the lasing intensity, its impact on the spectra at the anti-correlated states {(0,1) and (1,1)} is dramatic. The ratio of the spectra of $A_+$ 92 and $A_-$ 94 is reduced to less than 0.5 dB at the −45 dB level.

Yet according to another embodiment of the invention, data-revealing information is masked by injecting noise into long laser 12. The noise level can be higher than the amplitude of data-revealing information but lower than the amplitude of correlation frequency information.

The noise injection can be applied instead of or in addition to the band-pass filtering. FIG. 1 illustrates a long laser 12 that applied both noise injection and band-pass filtering.

Figure 5A:
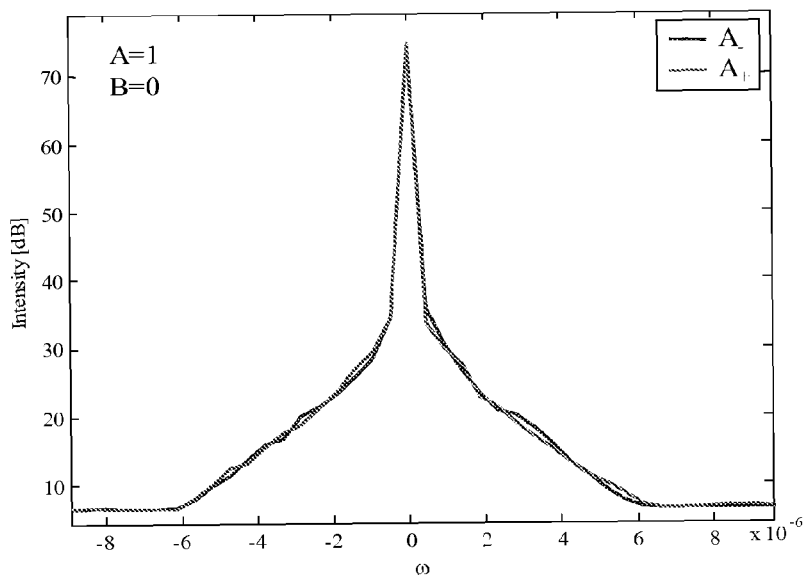
FIGS. 5a-5b illustrate the masking effect of a first and a second noise source.
Figure 5B:
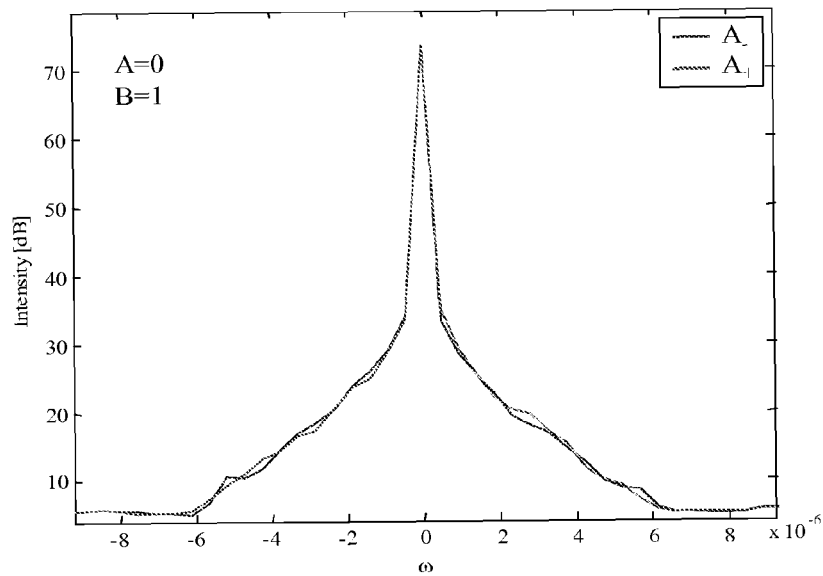

FIGS. 5a-5b illustrate the masking effect of first and second noise sources 54 and 64. These figures illustrate the steady state spectrum of the electromagnetic field at the middle of long laser 12, assuming that long laser 12 includes first and second filters 52 and 62 and includes first and second noise sources 54 and 64.

FIG. 5a illustrates a selection of third mirror 26 ("1") by Alice and of fourth mirror 32 ("0") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors). FIG. 5b illustrates a selection of first mirror 22 ("0") by Alice and of sixth mirror 36 ("1") by Bob. In this case the lasing frequency of laser 12 is $\omega_0$ but the amplitude of the $\omega_0$ light component is lower than the amplitude of the $\omega_0$ light component during the synchronization stage (when both parties selected their "T" mirrors). The spectrum of FIG. 5a is not a mirror image of the spectrum of FIG. 5b due to the addition of noise.

FIGS. 5a-5b show that while the additional noise does not significantly affect the lasing intensity, its impact on the spectra at the anti-correlated states $\{(0,1)$ and $(1,1)\}$ is dramatic.

It is noted that by injecting noise and/or performing band-pass filtering, the difference between the spectra of $A_\pm$ can be reduced almost arbitrarily, making the task of determining the exchanged bit technologically difficult for Eve. Those of skill in the art will appreciate that any practical measurement performed by Eve is limited by the noise floor and the dynamic range of her apparatus. Therefore, the communicating parties can reduce the signature of their bit selection below Eve's detection capability and achieve secure key distribution.

Figure 6:
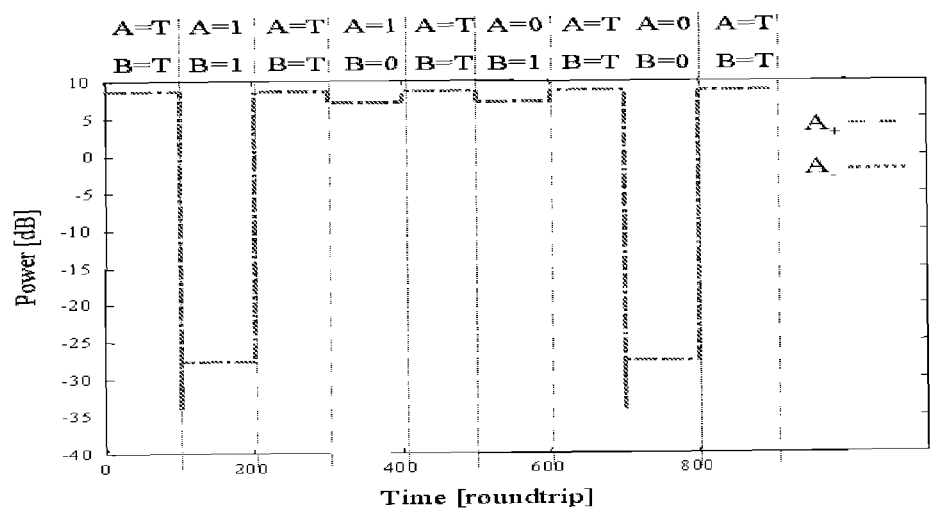
FIG. 6 illustrates the laser output power at $\omega_0$ for a sequence of bit selection.

FIG. 6 illustrates the laser output power at $\omega_0$ for a sequence of bit selection.

The sequence starts by a first synchronization stage, a first data transfer stage during which Alice and Bob select (1,1), a second synchronization stage, a second data transfer stage during which Alice and Bob select (1,0), a third synchronization stage, a third data transfer stage during which Alice and Bob select (0,1), a fourth synchronization stage, a fourth data transfer stage during which Alice and Bob select (0,0) and a fifth synchronization stage.

FIG. 6 illustrates that the power levels clearly distinguish between correlated (A=B) and anti-correlated (A≠B) bits. Note, that in the case of the anti-correlated bits, the intensities of $A_\pm$ are indistinguishable (although they are reflected from different mirrors) making it substantially impossible for Eve to learn of the choice of mirrors by monitoring the power.

It is noted that if both Bob and Alice select the same key during a certain data transfer stage this data transfer stage can be ignored. Thus, only data units exchanged during anti-correlated sessions $\{(0,1)$ or $(1,0)\}$ will be taken into account by Alice and Bob.

Figure 7:
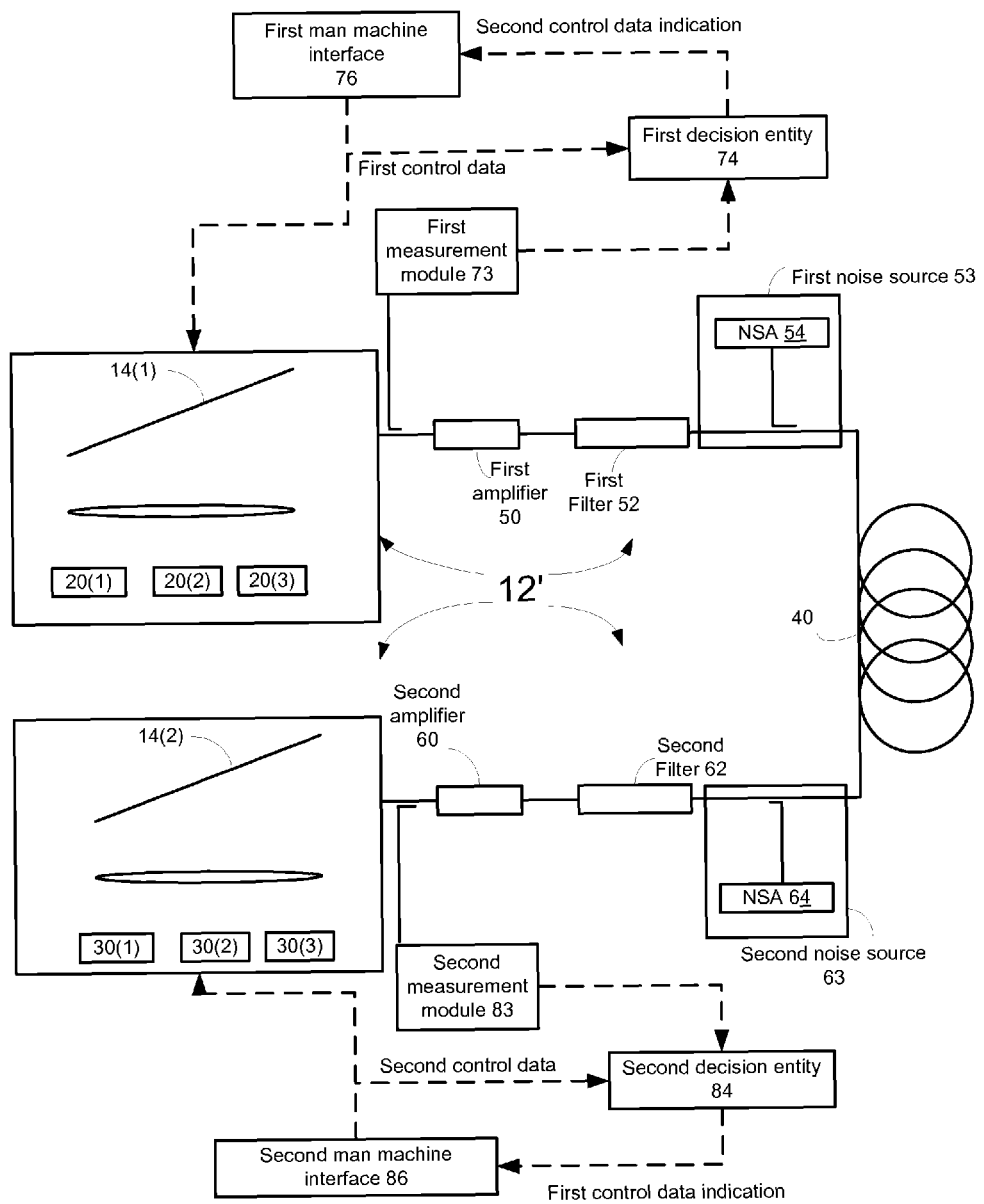
FIG. 7 illustrates a system according to another embodiment of the invention.

FIG. 7 illustrates system 10' according to another embodiment of the invention.

System 10' uses wavelength division multiplexing techniques, thus it can be used to exchange multi-bit data units per a single data transfer stage. Instead of using a single reflecting element per user and using a single fibre, multiple fibres (allowing different lasing characteristics) and multiple reflecting elements are utilized substantially and simultaneously, and wavelength selective distributing element (such as grating 14(1) for Alice and grating 14(2) for Bob) that are used (per user) for sending different light components to different reflecting elements.

FIG. 7 illustrates three different reflecting elements {20(1), 20(2) and 20(3) allocated to Alice and 30(1), 30(2) and 30(3) allocated to Bob} that are used simultaneously per user. These three reflecting elements can be regarded as a sub-group of reflecting elements.

Figure 8:
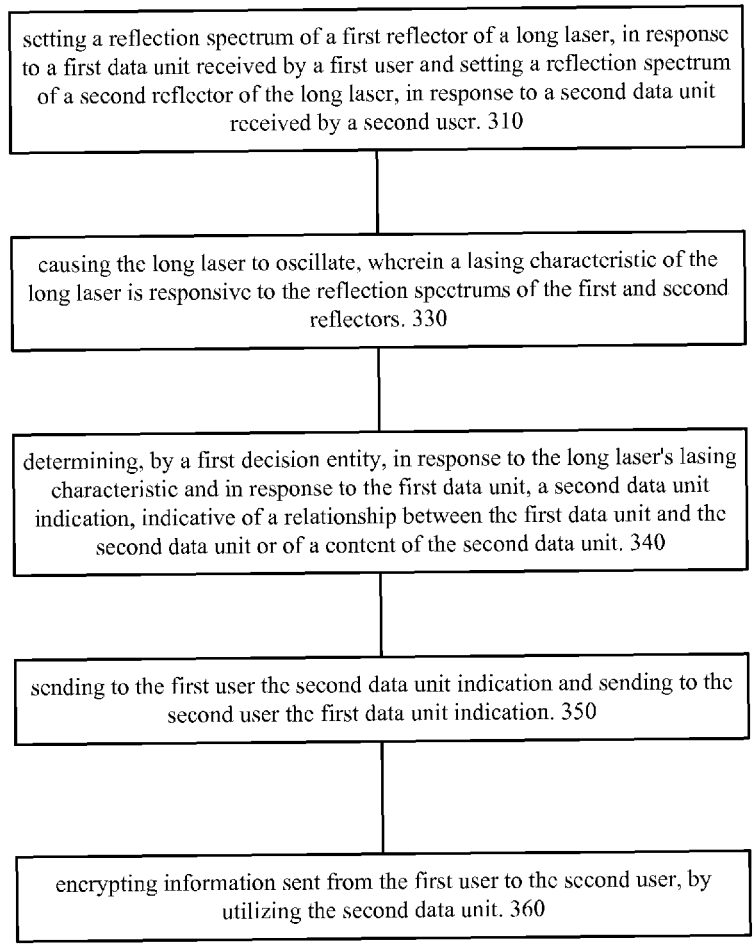
FIG. 8 is a flow chart illustrating a method for secure communication according to an embodiment of the invention.

FIG. 8 is a flow chart illustrating method 300 for secure communication according to an embodiment of the invention.

Method 300 starts by stage 310 of setting a reflection spectrum of a first reflector of a long laser, in response to a first data unit received by a first user and setting a reflection spectrum of a second reflector of the long laser, in response to a second data unit received by a second user.

Referring to the example set fourth in FIG. 1, Bob and Alice can send data units that select which mirrors will be used to reflect light.

Stage 310 is followed by stage 330 of causing the long laser to oscillate, wherein a lasing characteristic of the long laser is responsive to the reflection spectra of the first and second reflectors.

Stage 330 can include at least one of the following: (i) Selecting a selected reflector element of the first reflector in response to the first data unit. (ii) Selecting a selected sub-group of reflector elements of the first reflector in response to the first data unit. The selecting includes selecting the selected sub-group of reflector elements out of a group of reflector elements that are characterized by different reflection spectra. (iii) Altering a reflection spectrum of the first reflector, in response to the first data unit, by performing a mechanical movement. (iv) Filtering light reflected by the first reflector by a first band-pass filter, wherein a band-pass of the first band-pass filters includes the long laser's lasing frequency. (v) Masking reflectors signatures. (vi) Masking, by first and second noise sources, first and second reflectors signatures.

Stage 330 is followed by stage 340 of determining, by a first decision entity, in response both to the long laser's lasing characteristic and the first data unit, a second data unit indication, indicative of a relationship between the first data unit and the second data unit or of a content of the second data unit.

Conveniently, stage 340 further includes determining, by a second decision entity, in response both to the long laser's lasing characteristic and the second data unit, a first data unit indication, indicative of a relationship between the first data unit and the second data unit, or of a content of the first data unit.

Stage 340 is followed by stage 350 of sending to the first user the second data unit indication and sending to the second user the first data unit indication.

Conveniently, stage 350 is followed by stage 360 of encrypting information sent from the first user to the second user, by utilizing the second data unit. Stage 360 can include using the first and second data units to generate a key. Stage 360 usually is executed after multiple iterations of stage 310-350.

It is noted that method 300 can include performing an iteration of stages 310-350, determining (in the case of selecting the same data unit value by both parties) to ignore the results of the current iteration and to initiate another iteration of stage 310-350.

APPENDIX A

Calculation of Security Levels Provided by System 10

The security level provided by a communication system is determined by the ability of Eve to extract more information than merely the correlation between the bits.

As indicated above, the electromagnetic field evolving in the laser is a superposition of $A_+(\omega)$ 92 and $A_-(\omega)$ 94, defined at the middle of the system (z=L/2). The lengths of the long laser 12 and the active region are L and d respectively.

In each roundtrip, the (complex) amplitude of, say, $A_-$ 94 is filtered by first filter 52 and amplified by first amplifier 50, reflected by first reflector 20 and then amplified and filtered again to generate $A_+$ 93. In each amplification stage, a spontaneous emission (SE) noise of first amplifier 50 is added to the propagating field. A similar relation connects $A_+$ to $A_-$, thus, yielding the following coupled equations for the evolution of the field amplitudes:

$$A_+^{l+1}(\omega) = \quad (1)$$

$$\left\{\left[A_-^l(\omega)\exp\left(\frac{1}{2}i\beta L\right)\cdot T_{IF}(\omega)\exp(\gamma d/2) + A_S(\omega)\right]\cdot r_A(\omega)\exp(\gamma d/2) + A_s(\omega)\right\}\cdot T_{IF}(\omega)\exp\left(\frac{1}{2}i\beta L\right) + N_A(\omega)$$

$$A_-^{l+1}(\omega) = \left\{\left[A_+^l(\omega)\exp\left(\frac{1}{2}i\beta L\right)\cdot T_{IF}(\omega)\exp(\gamma d/2) + A_S(\omega)\right]\cdot r_B(\omega)\exp(\gamma d/2) + A_s(\omega)\right\}\cdot T_{IF}(\omega)\exp\left(\frac{1}{2}i\beta L\right) + N_B(\omega)$$

where l indicates the roundtrip index (or equivalently –time), $r_A$ and $r_B$ are respectively the spectral reflectance of first and second reflectors 20 and 30, $T_{IF}$ is the transmittance of first filter 52, $\beta$ is the (complex) propagation factor, $N_A$ and $N_B$ are the signals generated by first and second noise sources.

The overall gain in the active part of long laser 12 is given by $\exp(\gamma d/2)$ where $\gamma$ is the gain coefficient given by:

$$\gamma(\omega) = \frac{\gamma_0(\omega)}{1 + I/I_{SAT}} \quad (2)$$

where $\gamma_0(\omega)$ is the small signal (i.e., unsaturated) gain of the medium as determined by the pumping level, I is the overall intensity of the field in the active medium given by $$I = \int (|A_+(\omega)|^2 + |A_-(\omega)|^2) d\omega$$

where $I_{SAT}$ is the saturation intensity.

Both the gain $\gamma$ and the spontaneous emission power are proportional to the population inversion $\Delta N$ and, thus, the spontaneous emission amplitude emitted from a dz thick slice of the active medium is proportional to $\sqrt{\epsilon}dz$.

Taking into account the amplification of the spontaneous emission (SE) in the active region the power emitted from either side of the active medium (due to SE) is:

$$A_s(\omega) = \frac{2K}{\sqrt{\gamma}}(\exp(\gamma d/2) - 1) \quad (3)$$

where K is a proportion coefficient linking the square root of the gain to the emitted ASE.

In order to examine the security of the scheme, reasonable eavesdropping strategies Eve can employ are evaluated. For simplicity, the initial analysis will ignore the noise introduced by the first and second noise sources ($N_A = N_B = 0$).

It is assumed that Eve can tap the field evolving in the laser without being detected and perform any type of measurement. In particular, Eve can introduce a beam-splitter (or a fibre coupler) within long laser 12, separate $A_+$ from $A_-$ and analyze them separately. Like any classical electromagnetic wave, $A_\pm$ can be completely characterized by their spectral and temporal evolution—information which is available to Eve.

As indicated above, the anti-correlated cases {(0,1) or (1,0)} are more interesting. In these cases the intensities of $A_\pm$ are indistinguishable making it impossible for Eve to learn of the choice of mirrors by monitoring the power.

In principle, Eve can determine the exchanged bit in the anti-correlated bits case by careful examination of the spectrum of $A_\pm$. However, the difference between the two spectra can be made essentially as small as desired, and thus subvert Eve's spying, by including additional in-line filtering in the laser.

Thus, the difference between the spectra of $A_\pm$ can be reduced almost arbitrarily, making the task of determining the exchanged bit technologically difficult for Eve. The last property is of supreme importance because any practical measurement performed by Eve is limited by the noise floor and the dynamic range of her apparatus. Therefore, the communicating parties can always reduce the signature of their bit selection (imprinted in the SE spectrum of the laser) below Eve's detection capability and achieve secure key distribution. Alternatively (or in parallel), the noise level in the system can be increased by injecting into the fibre noise from an external broadband source (as illustrated in FIG. 1), thus "drowning" the faint signals Eve is trying to detect in noise, without affecting the primary laser oscillations.

Eve may also try to actively probe the mirrors' reflection spectrum in order to determine Alice and Bob's choice of mirrors. In this case, Eve's injected signal would be amplified by the first and second amplifiers and con be detected by Alice and Bob, and especially by the first and second measurement units.

In addition to simplicity, the suggested methods and systems provide enhanced key-establishing rate (compared to QKDS), especially at long ranges. The minimal time it takes a laser to establish oscillations or to shift its lasing wavelength is determined by the roundtrip time $-\tau = 2Ln/c$, where c is the speed of light in vacuum. For simplicity, it is assumed that the state of long laser 12 can be determined after $\sim 10\tau$. Therefore, the maximal data exchange rate is given by:

$$f_{max} \approx \frac{c/L}{20n} \quad (4)$$

Figure 9:
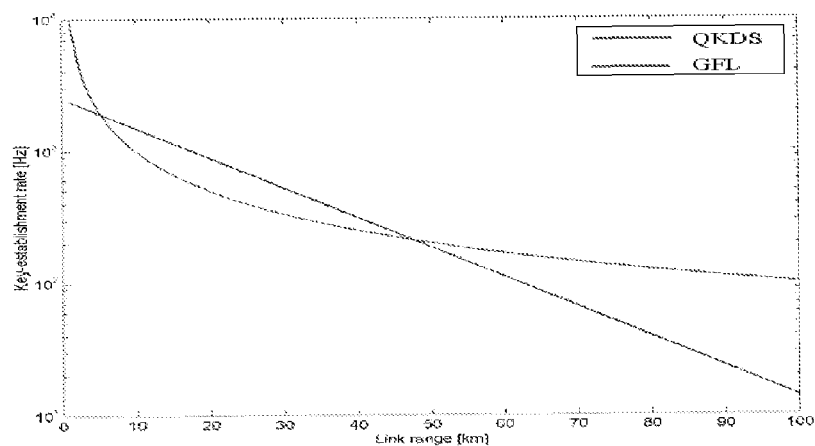
FIG. 9 illustrates a comparison between the maximal data exchange rate for the suggested method and systems and the maximal exchange rate for a QKDS system.

It is noted that the key-establishing rate decreases as Log $(f_{max}) \sim -\text{Log}(L)$ for the classical KDS while for QKDS this rate decreases as $\text{Log}(f_{max}) \sim -\alpha L$ where $\alpha$ is the loss coefficient in the fibre (imaginary part of $\beta$). Thus, as the length of the link increases, the illustrated systems and methods become more attractive. FIG. 9 illustrates a comparison between the maximal data exchange rate for the suggested method and systems, and the maximal exchange rate for a QKDS system. The illustrated systems and methods perform better at links that are longer than 48 kilometres.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

I claim:

1. A communication system, the communication system comprises:
   a first decision entity; and
   a long laser that comprises a first reflector and a second reflector;
   wherein a lasing characteristic of the long laser is responsive to: (i) first data unit that is provided by a first user and affects a reflection spectrum of the first reflector and (ii) second data unit that is provided by a second user and affects a reflection spectrum of the second reflector; and wherein the first decision entity is adapted to receive the first data unit and information representative of the lasing characteristic, as well as to determine (i) a relationship between the first data unit and the second data unit, or (ii) a content of the second data unit.

2. The communication system according to claim 1 further comprising a second decision entity; wherein the second decision entity is adapted to receive the second data unit and information representative of the lasing characteristic, as well as to determine (i) a relationship between the first data unit and the second data unit, or (ii) a content of the first data unit.

3. The communication system according to claim 1 wherein the first reflector is adapted to reflect laser light using a selected reflector element, in response to the first data unit, out of a group of reflector elements that are characterized by different reflection spectra.

4. The communication system according to claim 1 wherein the first reflector is adapted to reflect laser light using a selected sub-group of reflector elements, in response to the first data unit, out of a group of reflector elements that are characterized by different reflection spectra.

5. The communication system according to claim 1 wherein the first reflector alters its reflection spectrum, in response to the first data unit, by performing a mechanical movement.

6. The communication system according to claim 1 wherein the lasing characteristic is an amplitude of a light component that has a long laser's lasing wavelength.

7. The communication system according to claim 1 wherein the first decision entity is adapted to send to the first user an indication of the relationship between the first and second data unit and wherein the communication system further comprises a second decision entity that is adapted to send to the second user an indication of the relationship between the first and second data unit.

8. The communication system according to claim 1 wherein the long laser further comprises a first band-pass filter; wherein a band-pass of the first band-pass filters comprises the long laser's lasing frequency.

9. The communication system according to claim 1 further comprising a first masking unit, adapted to substantially mask a first reflector signature and a second masking unit, adapted to substantially mask a second reflector signature.

10. The communication system according to claim 1 further comprising: a first noise source, adapted to generate noise such as to substantially mask a first reflector signature; and a second noise source, adapted to generate noise such as to substantially mask a second reflector signature.

11. The communication system according to claim 1 further adapted to encrypt information sent from the first user to the second user, by utilizing the second data unit.

12. A method for communicating information, the method comprising:
   setting a reflection spectrum of a first reflector of a long laser, in response to a first data unit received by a first user;
   setting a reflection spectrum of a second reflector of the long laser, in response to a second data unit received by a second user;
   causing the long laser to oscillate, wherein a lasing characteristic of the long laser is responsive to the reflection spectra of the first and second reflectors; and
   determining, by a first decision entity, in response to the long laser's lasing characteristic and in response to the first data unit, a second data unit indication, indicative of a relationship between the first data unit and the second data unit or of a content of the second data unit.

13. The method according to claim 12 further comprising determining, by a second decision entity, in response to the long laser's lasing characteristic and in response to the second data unit, a first data unit indication, indicative of a relationship between the first data unit and the second data unit or of a content of the first data unit.

14. The method according to claim 12 wherein the causing comprises selecting a selected reflector element of the first reflector in response to the first data unit; wherein the selecting comprises selecting the selected reflector element out of a group of reflector elements that are characterized by different reflection spectra.

15. The method according to claim 12 wherein the causing comprises selecting a selected sub-group of reflector elements of the first reflector in response to the first data unit;
   wherein the selecting comprises selecting the selected sub-group of reflector elements out of a group of reflector elements that are characterized by different reflection spectra.

16. The method according to claim 12 wherein the causing comprises altering a reflection spectrum of the first reflector, in response to the first data unit, by performing a mechanical movement.

17. The method according to claim 12 wherein the lasing characteristic is an amplitude of a light component having a long laser's lasing wavelength.

18. The method according to claim 13 further comprising: sending to the first user the second data unit indication and sending to the second user the first data unit indication.

19. The method according to claim 12 further comprising filtering light reflected by the first reflector by a first band-pass filter; wherein a band-pass of the first band-pass filters comprises the long laser's lasing frequency.

20. The method according to claim 12 further comprising masking first and second reflectors signatures.

21. The method according to claim 12 further comprising masking, by a noise source, first and second reflectors signatures.

22. The method according to claim 12 further comprising encrypting information sent from the first user to the second user, by utilizing the second data unit.

* * * * *